United States Patent [19]
Boyette, Jr. et al.

[11] Patent Number: 6,093,930
[45] Date of Patent: Jul. 25, 2000

[54] AUTOMATIC PROBE REPLACEMENT IN A SCANNING PROBE MICROSCOPE

[75] Inventors: James Edward Boyette, Jr., Delray Beach; James Michael Hammond, Boca Raton; Salvatore R. Riggio, Jr., Boca Raton; Michael Servedio, Boca Raton, all of Fla.

[73] Assignee: International Business Machnines Corporation, Armonk, N.Y.

[21] Appl. No.: 09/054,013

[22] Filed: Apr. 2, 1998

[51] Int. Cl.[7] .................................................. H01J 37/067
[52] U.S. Cl. ...................................... 250/306; 250/442.11
[58] Field of Search ............................... 250/306, 442.11, 250/441.11; 73/105

[56] References Cited

U.S. PATENT DOCUMENTS

| | | | |
|---|---|---|---|
| Re. 34,489 | 12/1993 | Hansma et al. | 250/560 |
| 4,637,119 | 1/1987 | Schneider et al. | 29/568 |
| 4,649,623 | 3/1987 | Schneider et al. | 29/568 |
| 4,688,307 | 8/1987 | Schneider et al. | 29/26 A |
| 4,992,660 | 2/1991 | Kobayashi | 250/306 |
| 5,598,104 | 1/1997 | Boyette, Jr. | 324/754 |
| 5,672,816 | 9/1997 | Park et al. | 250/306 |

*Primary Examiner*—Kiet T. Nguyen
*Attorney, Agent, or Firm*—Richard A. Tomlin; Ronald V. Davidge

[57] ABSTRACT

A scanning probe microscope having a probe attachment fixture, to which a probe assembly is removably attached during measurements, driven in an engagement direction, and a sample stage driven in scanning directions perpendicular to the engagement direction includes a buffer with a number of buffer stations within the sample stage. When the stage is driven so that one of the buffer stations is in alignment with the attachment fixture, and when the attachment fixture is driven in the engagement direction to be in proximity to the buffer station, the probe assembly is selectively transferred in either direction between the attachment fixture and the buffer station. In a preferred embodiment, probe assemblies are transferred on transfer pallets, and a stationary magazine is provided for storing these pallets, which are transferred in either direction between the magazine and the buffer.

25 Claims, 4 Drawing Sheets

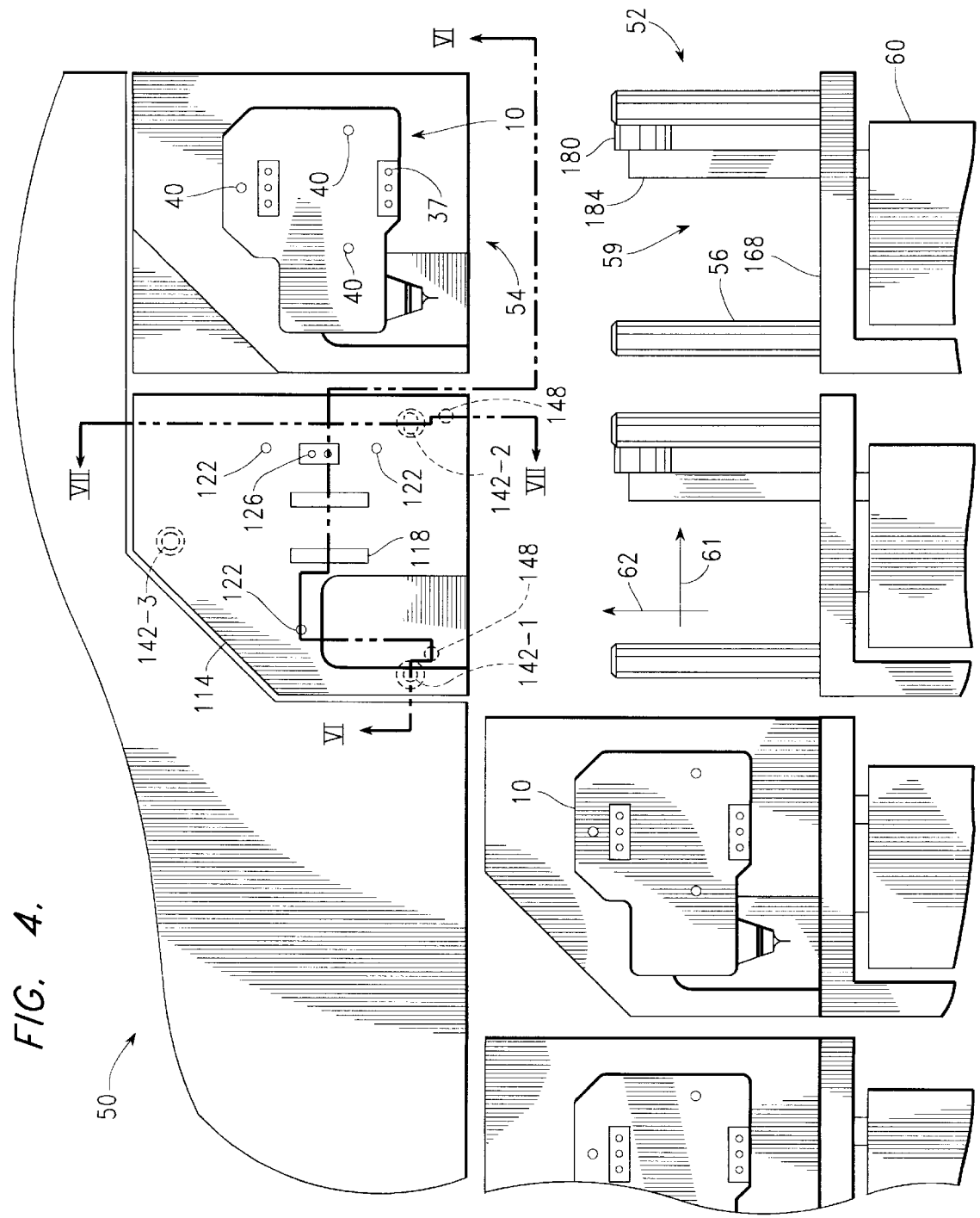

AUTOMATIC PROBE REPLACEMENT IN A SCANNING PROBE MICROSCOPE

BACKGROUND OF THE INVENTION

1. Field of the Invention

The present invention relates to scanning probe microscopy, and, more particularly, to providing means for automatically replacing probe tip assemblies within a scanning probe microscope without requiring manual intervention by the operator.

2. Background Information

In a scanning probe microscope, a scanning movement is established between a surface of a sample being investigated and a very sharp, very small probe tip. The phrase "scanning probe microscope" is meant herein to describe a device in which the scanning movement is derived from movement of the sample, from movement of the probe tip, or from a combination of these two types of movement, with movement of the sample being used to move between points at which measurements are made, while the scanning movement occurring within the probe itself is used to make measurements in the vicinity of each such point. This phrase is also meant to include an important group of devices known as "atomic force microscopes."

The probe tip of a scanning probe microscope is typically mounted to a distal end of a cantilever, the proximal end of which is attached to an excitation actuator. The excitation actuator is a piezoelectric actuator driven to cause the cantilever, and thereby the probe, to vibrate vertically. The excitation actuator itself is additionally moved vertically by means of a Z-axis actuator, which is typically driven in response to changes in the amplitude of vibration of the probe tip. Changes in amplitude of vibration are caused by variations in the height of the sample surface, which change the level of engagement between the probe tip and the sample. The Z-axis actuator is driven, for example, to maintain the amplitude of vibrations at a constant level, with the level of the signal driving the Z-axis actuator being recorded to provide an indication of the height of the sample surface.

As the scanning probe microscope moves from being a tool of basic research to more widespread use in the inspection of manufactured parts having critical surfaces, a number of limitations of the device and difficulties with its use become apparent. In particular, the probe tips themselves, being small and sharp, and being subject to high levels of stress, tend wear out or break quickly. A probe tip is typically changed as a probe assembly including the cantilever and the excitation actuator. Since such assemblies are particularly small and fragile, they are subject to handling damage whenever they are changed. Furthermore, the electrical connections to the excitation actuator present additional difficulties when a probe assembly has to be replaced. Also, since a scanning probe microscope used is an inspection tool is ideally operated almost continuously, the time required to change probes manually can have a significant effect on the throughput achieved in an inspection station.

Furthermore, since there is a variety of types of tips for a scanning probe microscope, with individual types of tips being customized for different modes of measurement, there is typically a need to switch types to take different types of measurements, even on the same sample. In many applications of scanning probe microscopy, probe tips are changed more often because of a need to introduce n different type of tip than because tips become worn out or broken.

Therefore, what is needed is a method for facilitating the process of changing the probe assemblies. In particular, such a method should allow such assemblies to be changed without manual intervention by the operator.

DESCRIPTION OF THE PRIOR ART

U.S. Pat. No. 4,992,660 describes a scanning tunneling microscope using a tip which can be easily replaced. Within the device, a tip holder is introduced into a transfer chamber, being carried in a chuck at an inner end of an introduction rod. Within the transfer chamber, a transfer rod carries a magazine with a number of externally threaded studs extending radially outward. The tip holder is placed on the magazine by driving the transfer rod inward, so that internal threads within the tip holder engage the external threads of a stud aligned with the introduction rod, and by rotating the introduction rod so that the tip holder screws onto the stud. A tip holder on the magazine is brought into the observation chamber, where measurements are taken, by first raising and rotating the transfer rod so that the tip holder is in alignment with a replacement rod within a chamber above the introduction rod. The replacement rod is then slid inward, so that a chuck at its end engages the tip holder, and is rotated to disengage the tip holder from the magazine. Then the magazine is moved downward, and the replacement rod is slid above the magazine and turned to engage the tip holder with a stud extending outward from the tip driver in the observation chamber. This process is reversed to remove the tip holder from the observation chamber. Both tip holders and sample holders are handled in this way, and the sample holder must be removed to the magazine before a tip holder can be replaced.

Thus, the device of U.S. Pat. No. 4,992,660 includes a separate magazine structure, which must be slid and rotated to carry the tip holders. Precise rotational and translational drives are used on three rods—the introduction rod, the transfer rod, and the replacement rod. What is needed is a device using drive motions otherwise needed and generated in the device to move the tip holders around. Also, the multiple engagement of the tip holders from threaded studs, and the disengagement of the tip holders therefrom, can be expected to generate wear debris, causing problems in a clean room environment, or in the high vacuum environment of the device of this patent. What is needed is a method for minimizing relative movement between the tip holders and the surfaces they engage during the processes of engagement and disengagement. Also, what is needed for many scanning probe microscope applications, is an efficient way of making electrical connections, a way of identifying different types of tip holders in the apparatus, and a way of replacing a damaged or worn out tip holder without having to remove the sample holder from the observation chamber.

U.S. Pat. No. Re 34,489 describes an atomic force microscope which is readily usable without extensive lost time for setup and repair. The probe is a cantilevered optical lever reflecting an incident laser beam. The probe is carried by a replaceable probe-carrying module which is factory set up and merely inserted and fine tuned by the user. The probe-carrying module also includes a provision for forming a fluid cell around the probe. Samples are easily mounted, replaced, and horizontally adjusted using a sample stage which is magnetically attached to the top of the scan tube.

While a probe-carrying module is thus provided, a mechanism for automatically changing such modules is not addressed. The user is required to insert and fine-tune such modules. What is needed is a method for changing probe tips without manual operator intervention.

U.S. Pat. No. 4,637,119, describes a receiver in the probe head of a multiple-coordinate measuring machine in which probe-pin combinations can be replaceably and precisely chucked. The receiver contains an isostatic three-point support against which the base of the probe-pin combination is drawn by an electrically operated camping device. The clamping device is coupled with the control computer of the measuring machine so that a probe change can be effected automatically. In a preferred embodiment, the clamping device consists of a permanent magnet and of an electromagnet by which the field of the permanent magnet can be selectively counteracted or increased to achieve pick-up and release functions. The permanent magnet is described as forming a core around which the coil of the electromagnet is wound.

However, with the electromagnet coil would around the permanent magnet, it is particularly difficult to change the magnetic field extending to the device being clamped by means of the permanent magnet. This is because a permanent magnet by its nature is particularly difficult to magnetize or demagnetize, retaining the magnetic characteristics placed within it during its manufacture in the presence of varying external fields. What is needed is a way to separate the electromagnet from the permanent magnet, so that the coil of the electromagnet can change the flux within a soft iron material. Also, in a scanning probe microscope having a mechanism for moving the sample in a scanning motion relative to the probe, what is needed is a means to use this motion to bring the probe into position for placement on the probe drive of the device. Furthermore, what is needed is a means to identify different types of probes used in the device, and a built in compliance to establish a soft transfer of delicate probe mechanisms.

U.S. Pat. No. 5,598,104 describes apparatus for positioning a probe in a flying-probe circuit tester. This apparatus includes a probe tip, a probe actuator connected to the probe tip, a probe plate coupled to the probe actuator, and a magnetic probe plate clamp that magnetically couples the probe plate, forming a slip plane that provides collision compliance for the probe positioning apparatus. One embodiment of the magnetic probe clamp uses a set of shoulder screws to provide quick attachment and release of the probe plate from the probe clamp. A second embodiment uses a magnetic shunt, activated by turning a lever, to disable the magnetic connection of the clamp from the probe plate.

For use in an automatic system for changing tip assemblies, both embodiments of the attachment mechanism of U.S. Pat. 5,598,104 have a disadvantage of requiring a rotary motion, of shoulder screws or of the magnetic shunt, to disable the attachment force. Such rotary motion is relatively difficult to achieve, for example with a motor, in the small space adjacent to a scanning probe microscope, and poses a danger of the generation of debris from friction. Such debris can cause problems within the clean room environment in which a scanning probe microscope is typically operated. What is needed for an automatic tip changer is an attachment mechanism which does not require such motion. Furthermore, what is needed is a method for automatically making electrical connections when various assemblies are brought together by the apparatus, and for breaking these connections when these assemblies are separated by the apparatus.

SUMMARY OF THE INVENTION

It is a first objective of the present invention to provide a mechanism for removing and replacing the tip of a scanning probe microscope without a need for manual intervention by the operator.

It is a second objective to provide a means for changing the tip of a scanning probe microscope in a manner minimizing the generation of wear debris.

It is a third objective to provide a means for storing a number of different types of probes in a scanning probe microscope, in a manner allowing the probes to be easily accessed and used.

It is a fourth objective to provide for the repeatable and precise location of a probe assembly in a scanning probe microscope.

It is a fifth objective to provide for making and breaking electrical connections when a probe assembly is inserted within or removed from a scanning probe microscope.

In accordance with a first aspect of the present invention, there is provided a scanning probe microscope including a probe assembly having a probe, a sample stage, an attachment fixture, a scanning drive mechanism, and an engagement actuator. The sample stage includes a chuck for holding a sample to be examined and a buffer including a number of buffer stations. Each buffer station includes a first mechanism for releasably holding the probe assembly. The attachment fixture, which holds the probe assembly during measurements made on a sample surface, includes a second mechanism for releasably holding the probe assembly. The scanning drive mechanism moves the sample stage in directions perpendicular to an engagement direction, moving the chuck adjacent the attachment fixture, and selectively moving each buffer station into alignment with the attachment fixture. The engagement actuator moves the attachment fixture in the engagement direction and opposite thereto. The engagement actuator moves the attachment fixture into proximity with a buffer station in alignment with the attachment fixture. The probe assembly is selectively moved in either direction between the attachment fixture and the buffer station when the buffer station is moved into alignment with the attachment fixture and when the attachment fixture is moved into proximity with the buffer station.

BRIEF DESCRIPTION OF THE DRAWINGS

FIG. 4 is a plan view of a tip buffer included in a sample stage and a magazine within the scanning probe microscope partially depicted in FIG. 1;

DETAILED DESCRIPTION

Figure 1:
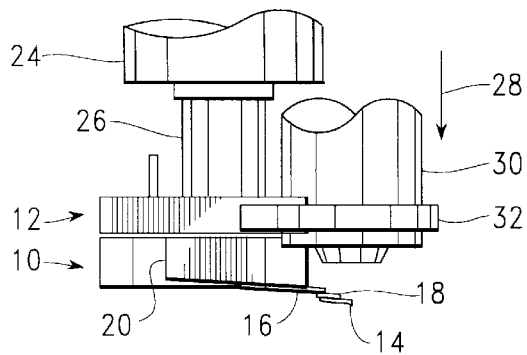
FIG. 1 is a right elevation of a changeable tip assembly mounted an associated adapter within an scanning probe microscope built in accordance with the present invention.
Figure 2:
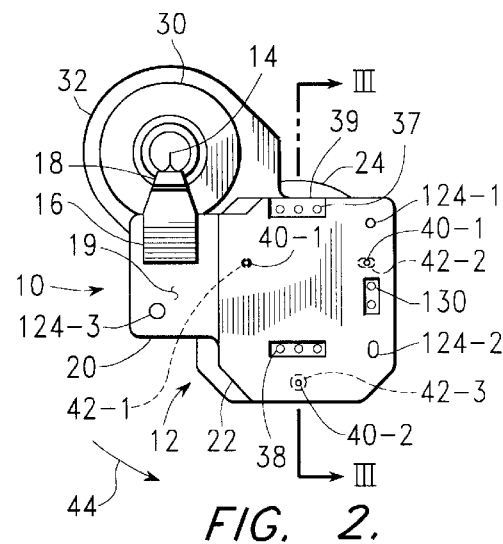
FIG. 2 is a bottom plan view of the tip assembly and associated adapter of FIG. 1.

FIGS. 1 and 2 show a probe tip assembly 10 removably engaged within an scanning probe microscope by means of an attachment fixture 12, with FIG. 1 being a left elevation of the apparatus, while FIG. 2 is a bottom plan view of the apparatus. The probe tip assembly 10 includes a tip and cantilever 14 attached to a piezoelectric bimorph actuator 16 by means of a locator 18 which is used for tip alignment when a tip is replaced. The bimorph actuator 16 is in turn attached to an inclined surface 19 of an outward-extending tab 20 forming a portion of a probe support plate 22. The attachment fixture 12 is attached to a Z-axis piezoelectric actuator 24.

In operation to measure a sample surface, the tip 14 is moved into engagement with the sample to be examined (not shown) in the engagement (Z-axis) direction indicated by arrow 28. This movement, which occurs as the Z-axis piezoelectric actuator 24 expands in response to an applied signal voltage, is controlled through the use of an optical approach subsystem 30 held within an attachment ring portion 32 of the attachment fixture 12. The tip 14 is vibrated in the engagement direction of arrow 28 by flexing the bimorph actuator 16 in response to an AC signal applied thereto.

Figure 3:
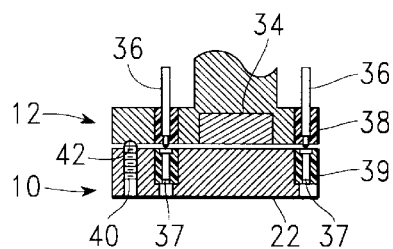
FIG. 3 is a vertical cross-sectional view of the tip and adapter of FIG. 1, taken as indicated by section lines III—III in FIG. 2.

FIG. 3 is a vertical cross-sectional view of the scanning probe tip assembly 10 removably engaged with the attachment fixture 12 taken as indicated by section lines III—III in FIG. 2. The tip assembly 10 is held in engagement with the attachment fixture 12 by means of a permanent magnet 34 embedded within the attachment fixture 12. The probe support plate 22, being composed of a ferrous magnetic alloy, is attracted and held in place by magnetic flux extending from the permanent magnet 34. This support plate 22 is preferably composed of a material sold under the trade name SUPER INVAR for thermal stability as well as for magnetic properties.

Continuing to refer to FIG. 3, and additionally referring again to FIG. 2, devices within the probe tip assembly 10 are electrically connected to circuits within the remaining portion of the atomic microscope by means of six spring contacts 36, each of which engages a contact post 37. The individual wires extending from these spring contacts 36 and contact posts 37, which are not shown in FIGS. 1–3, form portions of a circuit which will be discussed in reference to FIG. 11. Each spring contact 36 includes a tip having limited axial motion, which is pushed against an end of the associated contact post 38 by means of a spring within the contact 36. Spring contacts and contact posts of this kind are supplied, for example, by Rika Denshi America, of Attleboro, Mass. Three spring contacts 36 are mounted in each of two insulating contact holders 38 embedded within the attachment fixture 12, and three contact posts 37 are mounted in each of two insulating contact holders 39, embedded within the probe support plate 22.

The tip assembly 10 includes three spherical locators 40, each of which has a spherical tip that extends into a corresponding indentation 42 within the attachment fixture 12. The three indentations are preferably configured in the shape of a kinematic mount, with a first of these indentations 42-1 being conical, with the second of these indentations 42-2 being formed as a trough extending in alignment with the first of these indentations, and with the third of these indentations 42-3 providing a flat surface on which the spherical tip of a corresponding set screw 40 rests. With this mounting arrangement, a point of the tip assembly 10 is located in alignment with the attachment fixture 12 at the first indentation 42-1. The angular relationship between the tip assembly 10 and the attachment fixture 12 in the direction indicated by arrow 44 is determined by the relationship between the first indentation 42-1 and second indentation 42-2. The spherical locators 40 are preferably composed of two dowels 40-1 with spherical tips, and of a single setscrew 40-2 with a spherical tip. The setscrew 40-2, which is used to provide a leveling adjustment, is preferably placed within the indention 42-3 having a flat surface. Alignment of the tip assembly 10 about any axis perpendicular to the engagement direction indicated by arrow 28 is accomplished by engagement of the spherical tips of the three spherical locators 40 with the three indentations 42.

This method provides a simple, accurate, and highly repeatable method for removably attaching the probe tip assembly 10 to the attachment fixture 12. Since the attachment fixture 12 is moved straight downward, in the direction of arrow 28, onto the tip assembly 10, there is little sliding motion to cause the generation of debris, which could otherwise contaminate the clean room environment in which an scanning probe microscope is typically used. Nevertheless, the slopes of the indentations 42 and of the spherical ends of spherical locators 40 accommodate small movements to correct the alignment of the probe tip assembly 10 on the attachment fixture 12. The tip assembly 10 is easily removed from the attachment fixture 12 by applying an external force capable of overcoming the attachment force between the probe support plate 22 and the adjacent permanent magnet 34.

FIG. 4 is a fragmentary plan view of an scanning probe microscope using replaceable tips in the manner of the present invention. This microscope includes a sample stage 50, on which the sample to be inspected (not shown) is mounted, and a tip magazine 52 holding a number of tip assemblies 10. For example, the tip magazine 52 is configured to hold eight tip assemblies 10. When each tip assembly 10 is not attached to the attachment fixture 12 (shown in FIG. 1), it is mounted atop a transfer pallet 54. Each transfer pallet 54 can be held either within the tip magazine 52 on a pair of posts 56, or on a buffer 57, forming part of the sample stage 50, within a buffer station 58. The sample table 50 includes two buffer stations 58, while the tip magazine 52 includes, for example, eight tip magazine stations 59, each of which includes a pair of posts 56 and a pneumatic cylinder 60, which is used to move a transfer pallet 54 in either direction between the tip magazine station 59 and one of the buffer stations 58.

Figure 5:
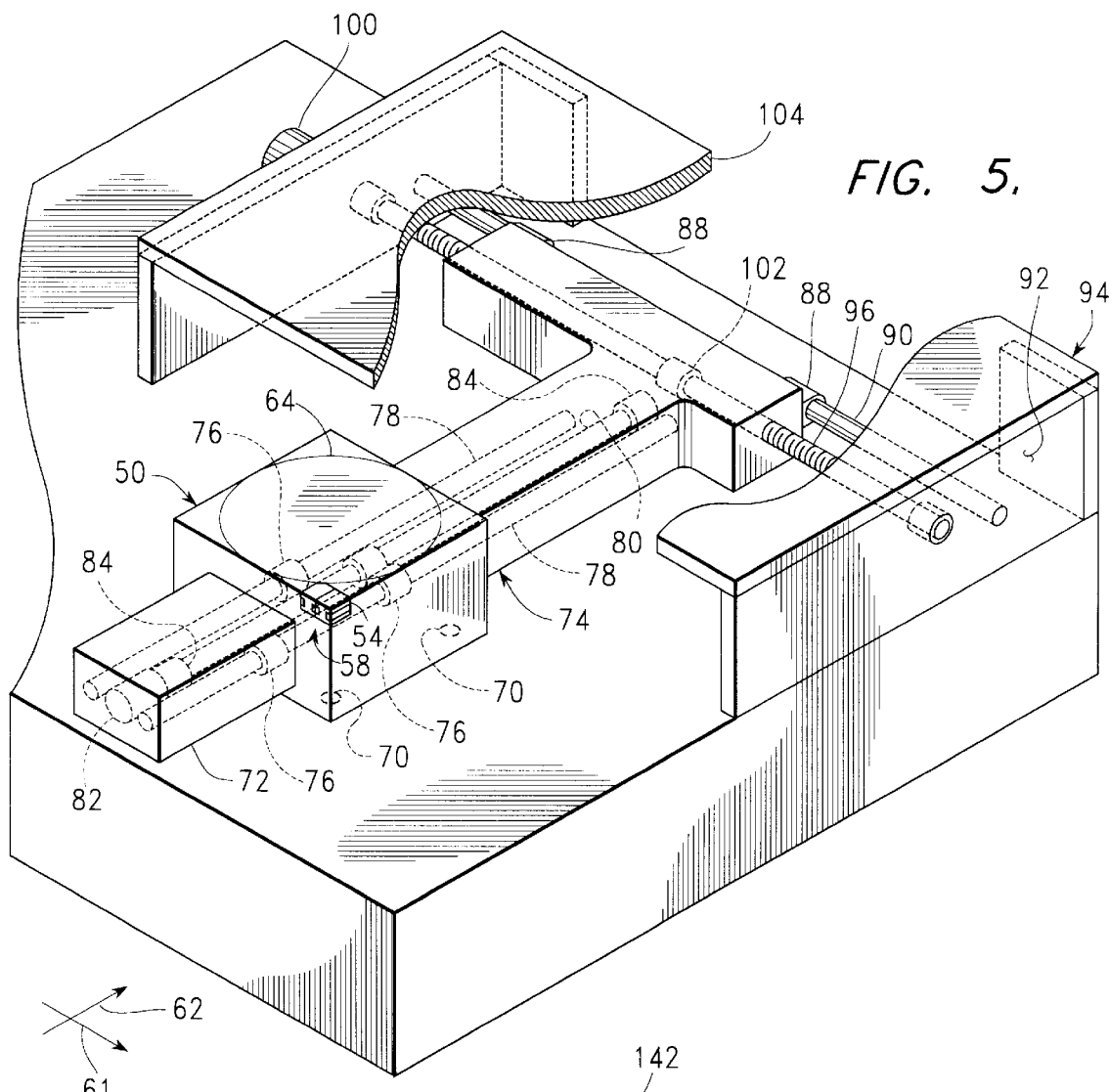
FIG. 5 is an isometric view of a sample stage drive mechanism of the scanning probe microscope of FIG. 4.

FIG. 5 is an isometric view of apparatus for moving the sample stage 50 in the horizontal X-direction indicated by arrow 61, and in the horizontal Y-direction indicated by arrow 62, while preventing movement of the sample stage 50 in the vertical direction indicated by arrow 28. This movement of the sample stage 50 is used both to scan the surface of a sample (not shown) being examined, relative to the tip 14 (shown in FIG. 1), during the process of scanning probe microscopy, and to move the transfer pallets 54 held in the buffer stations 58 on the sample stage 50 into alignment directly under the attachment fixture 12 (also shown in FIG. 1) so that a tip assembly 10 can be transferred in either direction between the attachment fixture 12 and the transfer pallet 54.

For operation of the apparatus as an scanning probe microscope, a sample (not shown) to be inspected is held to a vacuum chuck 64 on the top surface of the sample stage 50. While the vacuum chuck may be of various shapes, in this example it is round for accommodating circular disks to be measured. The sample stage 50 rides along upper surface 66 of a granite block 68, being supported by an air bearing 70 near each corner of a lower surface of the sample stage 50. The granite block 68 is manufactured with an extremely flat upper surface 66, so that vertical movement of the sample stage 50 is restricted.

The sample stage 50 is mounted to move in the Y-direction of arrow 62 along a forward extending leg 72 of a "T"-shaped carriage 74, with the alignment of the sample stage being maintained by linear bearings 76, mounted within the sample stage 50, moving along guide rails 78 mounted within the carriage 74. This movement of the sample stage 50 is caused by the rotation of a leadscrew 80 by means of a drive motor 82. The leadscrew 80, which is rotatably mounted in the carriage 74 by means of bearings 84, engages the sample stage 50 by means of a drive nut 86 mounted in the sample stage 50.

The carriage 74 is mounted to move in the X-direction, with linear bearings 88 of the carriage 74 moving along a guide rail 90 extending between sides 92 of a framework 94 bolted atop the granite block 68. This motion occurs with the rotation of a leadscrew 96, rotatably mounted within the framework 94 by bearings 98. The leadscrew 96, which is rotated by a drive motor 100, engages a nut 102 mounted within the carriage 74. Movement of the carriage 74 in the X-direction is imparted to the sample stage 50. An upper plate 104 of the framework 94 is used for mounting instrumentation, including the Z-axis actuator and approach subsystem 30 (shown in FIG. 1), for examining a surface of a sample fastened to the vacuum chuck 64.

The transfer pallets 54 are mounted at a corner of the sample stage 50, so that the area of the vacuum chuck 64 is avoided. In this way, two probe tip assemblies 10 may be carried by the sample stage 50 without interfering with the sample (not shown) to be inspected, as it is carried on the vacuum chuck 64. Since the sample stage drive mechanisms, as described above, are configured particularly for moving a sample placed on the vacuum chuck 64 into precise locations beneath the probe 14 (shown in FIG. 1) used to examine the sample, these mechanisms are also used to move the sample stage 50 so that either of the transfer pallets 54 carried in a buffer station 58 of the sample stage 50 is moved directly under the attachment fixture 12 (also shown in FIG. 1). After this motion has occurred, a tip assembly 10 carried by the attachment fixture 12 is transferred to an empty transfer fixture 54, or a tip assembly 10 carried to a transfer pallet 54 is transferred to the attachment fixture 12, which must be empty before the transfer is made.

Figure 6:
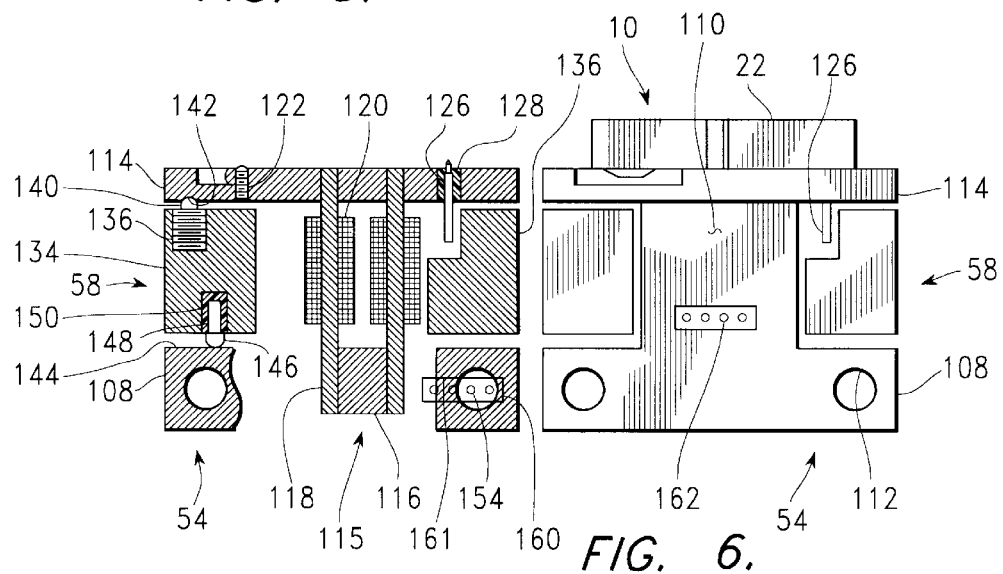
FIG. 6 is a first vertical cross-sectional view of the tip buffer of FIG. 4, taken as indicated therein by section lines VI—VI.
Figure 7:
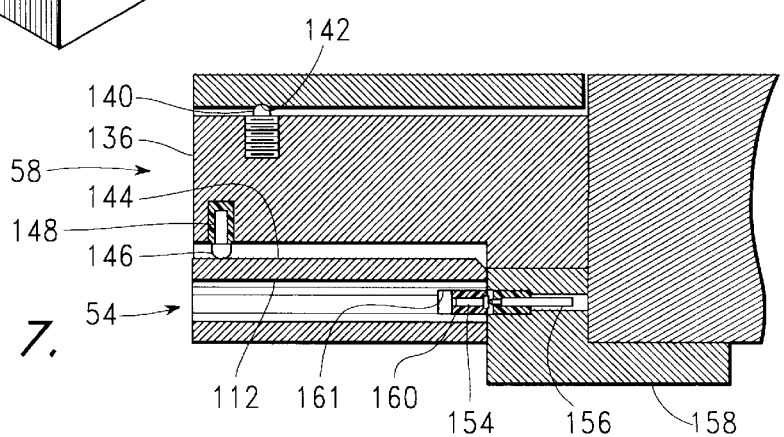
FIG. 7 is a second vertical cross-sectional view of the tip buffer of FIG. 4, taken as indicated therein by section lines VI—VI.

FIG. 6 is a fragmentary, partially sectional, view of the sample table 50, taken as indicated by section line VI—VI in FIG. 4, showing particular details of transfer pallets 54 and buffer stations 58. Similarly, FIG. 7 is a fragmentary, partially sectional, view of the sample table 50, taken as indicated by section line VII—VII in FIG. 4, showing additional details of transfer pallets 54 and buffer stations 58.

Referring to FIGS. 4 and 6, each transfer pallet 54 includes an "L"-shaped lower portion 108 and a rectangular upstanding front portion 110. The lower portion 108 includes a pair of holes 112, allowing the transfer pallet 54 to be slid onto the posts 56 of each tip magazine station 59 within tip magazine 52. A transfer plate 114, which is configured for the attachment of a tip assembly 10, is fastened atop the front portion 110. The transfer pallet 54 also includes magnetic means 115 for releasably holding a tip assembly 10 in place on the transfer plate 114. These magnetic means 115 include a permanent magnet 116, a pair of armature plates 118, between which the permanent magnet 116 extends, and a pair of bucking coils 120 with windings extending around an associated armature plate 118.

Continuing to refer to FIG. 6, and referring again to FIG. 1, when a tip assembly 10 is to be held on the transfer pallet 54, the bucking coils 120 are not electrically energized, and the magnetic circuit extending through the permanent magnet 116, the armature plates 118, and the probe support plate 22 provides a force holding the tip assembly 10 in place atop the transfer pallet 54. The permanent magnet 116 in the transfer pallet 54 is powerful enough to overcome the permanent magnet 34 (shown in FIG. 3) in the attachment fixture 12, so that a transfer of the tip assembly 10 from the attachment fixture 12 to the transfer pallet 54 occurs when the tip assembly 10 is brought downward, in the direction of arrow 28, by the motion of Z-axis actuator 24, into proximity with the transfer pallet 54, which has been aligned with the attachment fixture 12. The bucking coils 120 are arranged so that the magnetic flux produced within the armature plates 118 by the application of a driving signal to these coils opposes the magnetic flux from permanent magnet 116. When a driving signal is applied to bucking coils 120, the magnetic force holding a tip assembly 10 in place atop the transfer pallet 54 is sufficiently reduced that the tip assembly 10 is transferred from the transfer pallet 54 to the attachment fixture 12 if the attachment fixture 12 is in proximity with the tip assembly 10 and in alignment therewith.

Referring to FIGS. 2, 4, and 6, the accurate alignment of the tip assembly 10 as it is held atop the transfer pallet 54 is assured by a kinematic mount, of the type described above, for holding the tip assembly 10 in proper alignment with the attachment fixture 12. Thus, transfer pallet 54 includes three set screws 122 extending upward through the transfer plate 114. Each set screw 122 has a spherical end engaging a indentation 124 in the lower surface of probe support plate 22. A first indentation 124-1 is conical, a second indentation 124-2 is shaped as a trough aligned with the first indentation 124-1, and a third indentation 124-3 provides an enlarged flattened surface. The transfer pallet 54 also includes a pair of spring contacts 126, mounted within an insulating block 128, and aligned to engage a pair of contact posts 130 at the lower surface of the tip assembly 10. These contact posts 130 are connected by a resistor (not shown) within the tip assembly 10. The value of resistance of the resistor is used to identify the type of tip assembly, with various values of resistance being used to identify various different types of tip assemblies.

Continuing to refer to FIGS. 4 and 6, and referring additionally to FIG. 7, each buffer station 58 includes a pair of forward extending legs 134,136, over which a transfer pallet 54 is slid for placement on the sample table 50. The transfer pallet 54 is releasably secured to the buffer station 58 by means of three spring-biased plungers assemblies 138, each of which includes a spherical tip 140 which is held outward, in engagement with a corresponding indentation 142 in the transfer plate 114 of a transfer pallet 54. These indentations 142 provide a kinematic mount as described above, with a first indentation 142-1 fitting tightly over the corresponding plunger tip 140, with a second indentation 142-2 extending as a trough in alignment with the first indentation 142-1, and with a third indentation 142-3 providing a flat surface in which the corresponding plunger tip 140 rests.

After the transfer pallet 54 is installed within a buffer station 58, the transfer pallet is held upward, opposite the direction of arrow 28, with upper surfaces 144 of the "L"-shaped lower portion 108 of the transfer pallet 54 being held in contact with the heads 146, of pins 148, extending downward from the legs 134, 136 of the buffer station 58. These pins 148 are mounted within insulating blocks 150 and are wired to provide an indication of electrical contact between each pin 148 and the transfer pallet 54. Such contact indicates both that a transfer pallet 54 is in place within the buffer station 58 and that the transfer pallet 54 has not been pushed downward by movement of a tip assembly 10 in contact with the transfer pallet 54 during an attempt to transfer the tip assembly in either direction between the attachment fixture 12 and the transfer pallet 54.

The transfer pallet 54 also includes four contact posts 154, each of which is in electrical contact with a spring connector 156 extending within a lower block portion 158 of buffer station 58, when the transfer pallet 54 is fully inserted into the buffer station 58. These contact posts 154 are held within an insulating block 160, which is in turn adhesively attached within a slot 161 in the "L"-shaped lower portion 108. While this block 160 extends within a hole 112 provided for engagement with a shaft 56 of the tip magazine 52, such a shaft 56 is not long enough to contact the block 160. Similarly, the contact fixture at the front section 110 of transfer pallet 54 includes four contact posts 162, each of which is in electrical contact with a spring connector in a tip magazine station 59 of the tip magazine 52, when the transfer pallet is held in place within the tip magazine station 59.

Thus, electrical signals are carried between various circuits within the scanning probe microscope and any transfer pallet 54 which if fully engaged with either a tip magazine station 59 or a buffer station 58. These signals determine which type of probe tip assembly 10 is in place on the transfer pallet, by connection through contacts 130 to an identifying resistance. Furthermore, if no tip assembly 10 is in place on the transfer pallet 54, a measurement of this resistance will indicate an open circuit condition. These signals are also used to activate the bucking coils 120 within the transfer pallet 54. With the transfer pallet 54 in place within a buffer station 58, the bucking coils 120 are activated to release the probe tip assembly 10, so that it can be transferred to the attachment fixture 12. With the transfer pallet 54 in place in a tip magazine station 59, the bucking coils 120 are activated to release the probe tip assembly 10 so that it may be replaced with another probe tip assembly.

Figure 8:
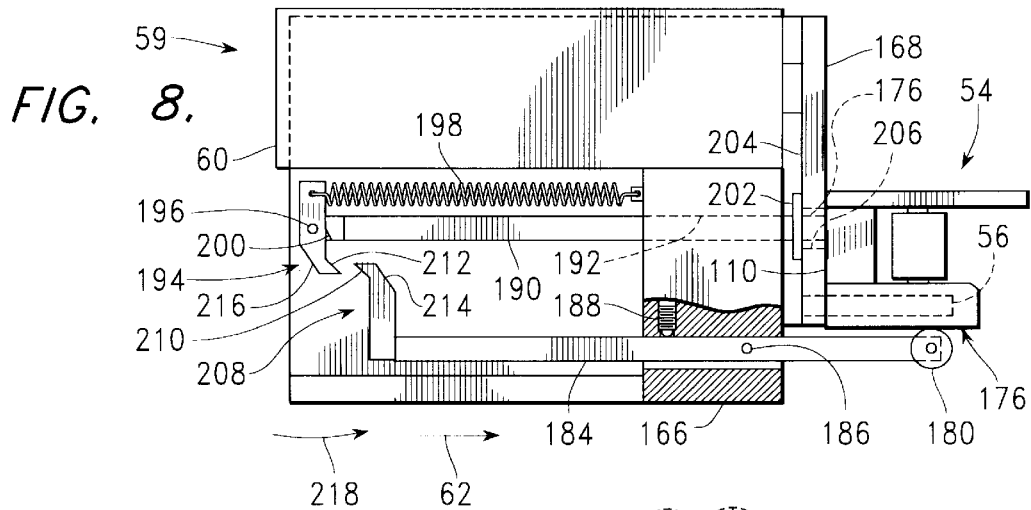
FIG. 8 is a partially sectional right elevation of a magazine stage within the magazine of FIG. 4.
Figure 9:
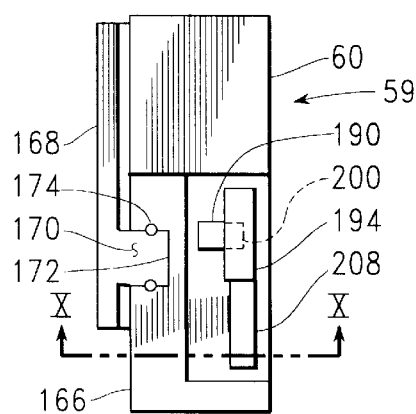
FIG. 9 is a front elevation of the magazine stage of FIG. 8.
Figure 10:
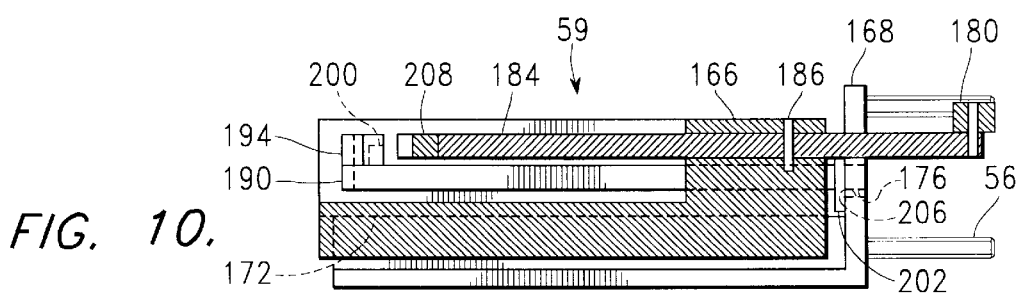
FIG. 10 is a bottom cross-sectional view of the magazine stage of FIG. 8, taken as indicated therein by section lines X—X.

FIGS. 8–10 show a tip magazine station 59, with FIG. 8 being a partly sectional right side elevation of thereof, with FIG. 9 being a front elevation thereof, and with FIG. 10 being a bottom plan cross-sectional view thereof, taken as indicated by section lines X—X in FIG. 9. Of these drawings, only FIG. 8 shows a transfer pallet 54 in place on the tip magazine station 59, which provides both a position for holding a transfer pallet 54, which may in turn hold a tip fixture 10 (shown in FIG. 1), within the tip magazine 52 (shown in FIG. 4), and a means for moving the transfer pallet 54 in either direction between the tip magazine 52 and a buffer station 58 (shown in FIG 6) held in alignment with the tip magazine station 59. Since the tip magazine station 59 stays in the same position within the tip magazine 52, it may be considered a stage or element of the tip magazine 52.

Referring to FIGS. 8–10, the tip magazine station 59 includes a pneumatic cylinder 60, which is mounted atop a stationary base 166. The pneumatic cylinder 60 moves an "L"-shaped transfer carriage 168 in the direction of arrow 62 to move a transfer pallet 54 from the tip magazine 52 (shown in FIG. 4) to a buffer station 58 (shown in FIG. 6), and then restores the transfer carriage 168 to its original position without the transfer pallet 54. The two shafts 56, on which the transfer station is moved and held within the tip magazine, extend outward from the transfer carriage 168, being attached thereto. To move a transfer pallet 54 from a buffer station 58 to the tip magazine 52, the pneumatic cylinder 60 first moves the transfer carriage 168 in the direction of arrow 62 into engagement with the transfer pallet 54, and then returns the transfer carriage 168 opposite the direction of arrow 62, along with the transfer pallet 54.

The pneumatic cylinder 60 acts in response to applied air pressure, as a single acting cylinder applying air pressure against a biasing spring, or as a double acting cylinder, applying air pressure to moved the transfer carriage 168 in either direction. This movement is constrained to be in the direction of arrow 62, and opposite thereto, by means of a bearing structure 170 forming a part of the transfer carriage 168 while moving within a slot 172 in the stationary base 166. Physical contact is made between the bearing structure 170 and the stationary base 166 through a number of rolling elements 174, which may be circulating balls, rollers operating in "V"-grooves having alternately perpendicular axes of revolution, or other rolling structures familiar to one who is skilled in the art of making such devices.

As described above, operation of the pneumatic cylinder 60 is the same, regardless of the direction in which the transfer pallet 54 is being moved, with the transfer plate 168 being moved first in the direction of arrow 62, and then opposite this direction. However, when the transfer pallet 54 is being moved to a buffer station 58, the transfer plate 168 must be conditioned to release the transfer pallet 54, while, when the transfer pallet 54 is being moved from a buffer station 58, the transfer carriage 168 must be conditioned to attract and retain the transfer pallet 54. This conditioning is based on the presence of a transfer pallet 54 in the tip magazine station 59 before the pneumatic cylinder 60 is operated, indicating that this transfer pallet 54 is to be released, or on the absence of a transfer pallet 54 in the tip magazine station 59 before the pneumatic cylinder 60 is operated, indicating that a transfer pallet 54 is to be attracted and retained.

The process of attracting and retaining or releasing a transfer pallet 54 is dependent upon the movement of a permanent magnet 176 with the transfer carriage 168. When a transfer pallet 54 is in place within the tip magazine 52 on shafts 56 of the tip magazine station 59, as shown in FIG. 8, a lower surface 178 of the transfer pallet 54 holds a roller 180 downward, in the direction of arrow 182. This roller 180 is rotatably mounted on a lever 184, which is in turn pivotally mounted within the stationary base 166 at a pivot pin 186. A spring-biased plunger mechanism 188, which is also disposed within the stationary base 166, presses downward on the other end of the lever 184, holding the roller 180 in contact with the lower surface 178.

The magnet 176 is mounted at an end of a magnet bar 190, which is mounted to slide in and opposite to the direction of arrow 62 within a hole 192 extending through a portion of stationary base 166. A pawl 194, pivotally mounted on the magnet bar 190 by a pin 196, is held by means of an extension spring 198 against a stopping surface 200 extending outward from the magnet bar 190. This spring 198 also acts to hold a flange portion 202 of magnet bar 190 against an inner surface 204 of the transfer carriage 168, so that the magnet bar 190 moves with the transfer carriage 168, with magnet 176 extending within a hole 206 in the carriage 168.

When the magnet 176 is held in this position with the transfer pallet 54 in place on the shafts 56, the magnetic attraction occurring between the magnet 176 and the front portion 110 of transfer pallet 54 holds the transfer pallet 54 in place on the shafts 56.

However, when the transfer carriage 168 is moved in the direction of arrow 62 with a transfer pallet 54 in place as shown in FIG. 8, movement of the magnet bar 190 in the direction of arrow 62 is stopped when pawl 194 comes into contact with an interposer 208 extending upward as a portion of the lever 184. After this occurs, motion of the transfer carriage 168 in the direction of arrow 62 continues, with the carriage 56 being released from the attractive forces of magnet 176. The pawl-engaging surface 210 of interposer 208 and the interposer-engaging surface 212 of pawl 194 are inclined so that the pawl 194 and interposer 208 are held locked together by the force of extension spring 198 even when the transfer pallet 54 is moved, in the direction of arrow 62, out of contact with roller 180.

Continuing to refer to FIG. 8, and referring again to FIGS. 4 and 6, when the transfer carriage 168 is moved to the limits of its motion in the direction of arrow 62, the transfer pallet 54 is moved into full engagement with a buffer station 58, so that three spring-biased plungers 140 within the buffer station 58 are moved into corresponding indentations 142 within the transfer plate 114 of the transfer pallet 54. A detenting action of these plungers 114 in indentations 142 is sufficient to hold the transfer pallet 54 in place on the buffer station 58, in the absence of a significant attractive force from magnet 176, as the shafts 56 are withdrawn from buffer station 58 with a return movement of the transfer carriage 168 in the direction opposite arrow 62.

On the other hand, when a transfer pallet 54 is to be transferred from a buffer station 56 to the tip magazine 52, the buffer station 56 is first aligned with an empty tip magazine station 59 within the tip magazine 52. The lever 184 of the empty tip magazine station 59 is pivoted by means of plunger mechanism 188 so that the roller 180 is moved upward, opposite the direction of arrow 182, in the absence of a transfer pallet 54 on shafts 56 of the tip magazine station 59. This pivoting of lever 184 moves the upward-extending interposer downward, out of the path of pawl 194, allowing extension spring 198 to move magnet bar 190 with flange 202 in contact with inner surface 204 of the transfer carriage 168 throughout the motion of this carriage 168 in the direction of arrow 62. As this motion is completed, an attractive force is established between the magnet 176 and the upstanding block portion 110 of the transfer pallet 54 in place on a buffer station 58. As the reverse motion of the transfer carriage 168, opposite the direction of arrow 62, is begun, the attractive force from magnet 176 is sufficient to overcome the detent force holding the transfer fixture 54 in place on the buffer station 58, with plungers 114 from the buffer station 58 within the indentations 142 of the transfer pallet 54. Thus, during the reverse motion of the transfer carriage 168, the transfer pallet 54 is pulled off the buffer station 58 by means of the magnet 176 moving with the transfer carriage 168.

During this return motion of transfer carriage 168, opposite the direction of arrow 62, the lower surface 178 of the transfer pallet 54 comes into contact with roller 180. This contact moves the roller 180 downward, pivoting lever 184 so that interposer 208 is moved upward, into the path of pawl 194, which is returning opposite the direction of arrow 62. However, the reverse surfaces 214 and 216 of interposer 208 and pawl 194, respectively, are inclined so that continued movement of the magnet bar 190 with these surfaces 214, 216 in contact causes the pawl 194 to rotate on pin 196 in the direction of arrow 216, moving over the interposer 208 to rotate back into the position shown in FIG. 8.

Figure 11:
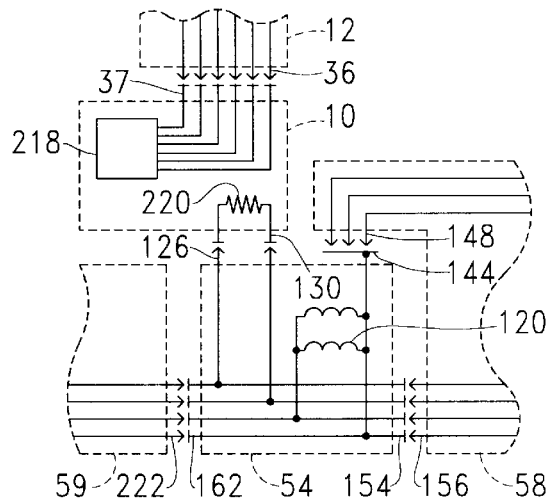
FIG. 11 is a schematic view of electrical elements within the tip assembly of FIG. 1, within a transfer pallet of FIG. 4, and within the buffer and magazine of FIG. 4.

FIG. 11 is a schematic view showing electrical connections within and between the various components of the present invention. When the probe tip assembly 10 is held in engagement with the attachment fixture 12, six electrical connections between spring contacts 36 and contact posts 37 connect up to six output lines from the attachment fixture 12 to the various electrodes of a piezoelectric actuator 218 within the probe tip assembly 10. The number of such connections actually required depends on the type of piezoelectric actuator being used. In the simplest case, a bimorph actuator providing only vertical vibration requires only connections to a drive electrode, vibration excitation and a grounding electrode. On the other hand, the piezoelectric actuator may provide scanning along the sample surface, in X- and Y-directions, along with vibration in the vertical direction, or Z-axis. Such an actuator requires connections to +X, -X, +Y, -Y, vibration excitation, and grounding electrodes, using the six electrical connections available from the attachment fixture 12.

When the probe tip assembly 10 is in place on the transfer pallet 54, electrical connections are made through spring contacts 126 and contact posts 130 between the transfer pallet 54 an identification resistor 220 within the probe tip assembly 10. The resistance value of this resistor 220 indicates the particular type of probe tip assembly 10, differentiating among several different types of probe tip assemblies which may be used. This information indicates, for example, which of the electrical connections through contact posts 37 need to be driven, and how the should be driven. When the transfer pallet 54 is engaged with both the probe tip assembly 10 and a tip magazine station 59, the resistor 220 is further connected to the tip magazine station 59 through a pair of contact posts 162 and associated spring contacts 222. In this way, the type of tip assembly in each tip magazine station 59 of the tip magazine 52 is known at all times. Alternately, when a transfer pallet 54 is engaged with both the tip magazine station 59 and with a buffer station 58, the resistor 220 is further connected to the buffer station 58 through a pair of contact posts 154 and associated spring contacts 156. In this way, the type of tip assembly in each buffer station 58 of the sample stage 50 (shown in FIG. 5) is also known. In either case, an open circuit in place of an expected level of resistance indicates the absence of a probe tip assembly 10.

As previously described in reference to FIG. 6, the tip assembly 10 is normally held in place on the transfer pallet 54 by a permanent magnet 116 within this fixture 54, being released for removal by the activation of a pair of bucking magnet coils 120. When the transfer pallet 54 is engaged with a tip magazine station 59, bucking magnet coils 120 are connected to circuits therewithin by means of the remaining spring contacts 222 and contact posts 162. This connection allows the attractive force holding the tip assembly 10 on a transfer pallet 54 to be overcome when a tip assembly is to be removed manually from the fixture 54. When the transfer pallet 54 is engaged with a buffer station 58, bucking magnet coils 120 are connected to circuits therewithin by means of the remaining spring contacts 156 and contact posts 154. This connection allows the attractive force holding the tip assembly 10 on the transfer pallet 54 to be overcome so that the tip assembly 10 can be transferred from the transfer pallet 54 to the attachment fixture 12.

Also as previously described in reference to FIG. 6, the transfer pallet 54 is normally held upward within a buffer station 58, so that a contact surface 144 of the transfer pallet 54 is held against three contact pins 148. This contact surface 144 is electrically grounded through a spring contact 156 and a mating contact post 154. When the attachment fixture 12 is moved downward to transfer a tip assembly 10 in either direction between the attachment fixture 12 and the transfer pallet 54, the connection between contact pins 148 and electrical ground is broken. This condition is measured using, for example, a pull-up resistor (not shown), in a manner well known to those skilled in the art, within the apparatus to provide a signal when the circuit is opened. When all three circuits through contact pins 148 are opened, the downward motion of attachment fixture 12 is stopped.

Referring to FIGS. 1 and 4–6, operation of apparatus built in accordance with the present invention will now be described in terms of four transfer operations. In the first transfer operation, a probe assembly 10 is transferred from a buffer station 58, attached to the sample stage 50, to the attachment fixture 12. In the second transfer operation, a probe assembly 10 is transferred from the attachment fixture 12 to a buffer station 58. In the third transfer operation, a transfer pallet 54 is moved from a tip magazine station 59, within the tip magazine 52, to a buffer station 58 attached to the sample stage 50. In the fourth transfer operation, a transfer pallet 54 is moved from a buffer station 58 to a tip magazine station 59.

The successful completion of the first transfer operation requires that the attachment fixture 12 must be initially empty to receive the probe assembly 10. This operation begins by moving the sample stage 50, using the drive motors 82, 100, into a position in which the probe assembly 10 being transferred is directly below, and in alignment with, the attachment fixture 12. The attachment fixture 12 is next lowered, using the Z-axis piezoelectric actuator 24, until open circuit conditions at the pins 148 indicate that the attachment fixture 12 has moved the probe assembly 10, and hence the transfer pallet 54 under it, downward within the buffer station 58. When this occurs, the downward motion of attachment fixture 12 is stopped, and bucking coils 120 are energized to release the probe assembly 10 from transfer pallet 54. The attachment fixture 12 is then moved upward by means of the actuator 24, carrying the probe assembly 10 through the attractive force of magnet 34. When the probe assembly 10 has been moved away from transfer pallet 54, the flow of current through bucking coils 120 is stopped.

The successful completion of the second transfer operation requires that one of the buffer stations 58 of the sample stage 50 must initially hold a transfer pallet 54 which is empty for receiving the probe assembly 10. This operation begins by moving the sample stage 50, again using drive motors 82, 100, into a position in which the empty transfer pallet 54 is directly under, and in alignment with, the probe assembly 10 held by the attachment fixture 12. Next, the attachment fixture 12 is lowered, using the Z-axis actuator 24, again until open circuit conditions occur at the pins 148. When this occurs, the downward motion of the attachment fixture 12 is stopped, and the probe assembly 10 is transferred from the attachment fixture 12, with the attractive force from permanent magnet 116 overcoming the attractive force from magnet 34. Then, the attachment fixture 10 is returned upward using the actuator 24, with the probe assembly 10 remaining on the transfer pallet 54.

Referring to FIGS. 4, 5, and 8, the third transfer operation begins with moving the sample stage 50, using motors 82, 100 as required, so that an empty buffer station 58 is adjacent to, and aligned with, the transfer pallet 54 to be moved onto the buffer station 58. Next, the pneumatic cylinder 60, of the tip magazine station 59 holding the transfer pallet 54 to be moved, is actuated to move the transfer carriage 168 in the direction of arrow 62. Since the transfer pallet 54 is initially in place on the shafts 56 of the tip magazine station 59, the movement of magnet shaft 190 is restricted by contact between pawl 194 and interposer 208, releasing the magnetic force holding the transfer pallet 54 on the tip magazine station 59. Thus, as the movement of transfer carriage 168 is completed, the detent forces provided by pins 140 moving into indentations 142 are sufficient to hold the transfer pallet 54 in place on the buffer station 58 as the pneumatic cylinder 60 returns the transfer carriage 168 opposite the direction of arrow 62.

The fourth transfer operation begins with moving the sample stage 50, using motors 82, 100 as required, so that the transfer pallet 54 to be moved to the tip magazine station 59 is adjacent to, and aligned with, this station 59. Next, the pneumatic cylinder 60, of the tip magazine station 59, is actuated to move the transfer carriage 168 in the direction of arrow 62. Since the transfer pallet 54 is initially not in place on the shafts 56 of the tip magazine station 59, magnet shaft 190 moves with the transfer carriage 168. As the transfer carriage 168 reaches the end of its motion in the direction of arrow 62, an attractive force is established between magnet 176 and the transfer pallet 54. As the transfer carriage 168 is subsequently returned, opposite the direction of arrow 62, this attractive force overcomes the detent forces provided by pins 140 within indentations 142, so that the transfer carriage 168 returns holding the transfer pallet 54.

These four transfer operations are combined in various ways to produce the required movements of tip assemblies 10 and transfer pallets 54. For example, with an empty transfer pallet 54 and a transfer pallet holding a tip assembly 10 in the two buffer stations 58 of the sample stage 50, the tip assembly 10 in one of the buffer stations 58 can be interchanged with a tip assembly 10 in the attachment fixture 12. This is done by using the second transfer operation to transfer one tip assembly 10 from the attachment fixture 12 to the empty transfer pallet 54, and by the using the first transfer operation to transfer the other tip assembly 10 from the other transfer pallet 54 to the attachment fixture 12. A tip assembly 10 on the attachment fixture 12 is moved to the tip magazine 52 by first applying the second transfer operation to transfer to tip assembly 10 from the attachment fixture 12 to an empty transfer pallet 54 on a buffer station 58, and by then applying the fourth transfer operation to move the transfer pallet 54, with the tip assembly 10 attached thereto, to an empty tip magazine station 59. A tip assembly 10 is moved from the tip magazine 52 to the attachment fixture 12 by first applying the third transfer operation to move the tip assembly 10 on a transfer pallet 54 from a tip magazine station 59 to a buffer station 58, and by then applying the first transfer operation to move the tip assembly 10 from the buffer station 58 to the attachment fixture 12.

While it is understood that there appears to be something of the old carnival "shell game" in all of this, the type of computing system generally used to control operations of this kind can easily keep track of where empty transfer pallets 54 are located, moving them where they are needed before transfer operations are begun. The feature of tip assembly type identification associated with the use of identification resistor 220 can also help such a system identify where a particular type of probe is located.

While the preferred embodiment described above includes a tip magazine 52 to provide a large number of positions in which tip assemblies 10 may be stored for use in the scanning probe microscope, an alternative embodiment of the present invention, does not have the tip magazine 52. Instead, the number of buffer stations 59 is preferably increased beyond the two such fixtures shown in FIGS. 4 and 5, and only the first and second transfer operations are used. This embodiment is substantially less complex, at the expense of having fewer available tip assemblies 10. Preferably, this embodiment retains transfer pallets 54 which are moved vertically to break the electrical connections between pins 148 and surface 144, as described above in reference to FIG. 6. Also as described above, the opening of such electrical connections is preferably used to terminate downward motion of the attachment fixture 12.

While the invention has been shown and described with reference to preferred embodiments, it is understood that this description is made to provide an example, and that various changes in form and arrangement of parts may be made therein without departing from the spirit and scope of the invention.

What is claimed is:

1. A scanning probe microscope comprising:

a probe assembly including a probe;

a sample stage including a chuck for holding a sample to be examined and a buffer including a plurality of buffer stations, wherein each buffer station within said plurality thereof includes first means for releasably holding said probe assembly;

an attachment fixture including second means for releasably holding said probe assembly during measurements made with said probe assembly;

scanning drive means for moving said sample stage in directions perpendicular to an engagement direction, wherein said scanning drive means moves said chuck adjacent said attachment fixture, and wherein said scanning drive means selectively moves each buffer station within said plurality thereof into alignment with said attachment fixture; and an engagement actuator moving said attachment fixture in said engagement direction and opposite thereto, wherein said engagement actuator moves said attachment fixture into proximity with a buffer station in said plurality thereof and in alignment with said attachment fixture, and wherein said probe assembly is selectively moved in either direction between said attachment fixture and said buffer station when said buffer station is moved into alignment with said attachment fixture and when said attachment fixture is moved into proximity with said buffer station.

2. The scanning probe microscope of claim 1, wherein a portion of said probe assembly is composed of a ferromagnetic material, said first means for releasably holding said probe assembly includes a first permanent magnet, and an electromagnet which is actuated to counteract an attractive force between said first permanent magnet and said probe assembly, said second means for releasably holding said probe assembly includes a second permanent magnet in said attachment fixture, said first permanent magnet holds said probe assembly against a first holding surface of said buffer station when said electromagnet is not actuated and when said attachment fixture and said buffer station are held in proximity to one another with said probe assembly therebetween, and said second permanent magnet holds said probe assembly against a second holding surface of said attachment fixture when said electromagnet is actuated and when said attachment fixture and said buffer station are held in proximity to one another with said probe assembly therebetween.

3. The scanning probe microscope of claim 1, wherein each buffer station within said plurality thereof includes a transfer pallet on which said probe assembly is placed, each said transfer pallet is held against a pallet contact surface within said buffer station by a biasing force acting opposite said direction of engagement, each said buffer station includes first sensing means detecting when said transfer pallet is moved away from said pallet contact surface, and said engagement actuator operates in response to said first sensing means, stopping motion of said attachment fixture in said engagement direction when said transfer pallet is moved away from said pallet contact surface.

4. The scanning probe microscope of claim 3, wherein said probe assembly includes an electronic device identifying said probe assembly and a first pair of contact terminals connected to said electronic device; and said transfer pallet includes a second pair of contact terminals engaging said first pair of contact terminals when said probe assembly is held on said transfer pallet.

5. A scanning probe microscope comprising:

a probe assembly including a probe;

a first plurality of transfer pallets, wherein each transfer pallet within said first plurality thereof includes first means for releasably holding said probe assembly;

an attachment fixture including second means for releasably holding said probe assembly;

a sample stage including a chuck for holding a sample to be examined and a buffer including a second plurality of buffer stations, wherein each buffer station within said second plurality thereof includes first means for releasably holding a transfer pallet within said first plurality thereof;

a stationary magazine including a third plurality of magazine stations, wherein each magazine station within said third plurality thereof includes second means for releasably holding a transfer pallet within said first plurality thereof;

scanning drive means for moving said sample stage in directions perpendicular to an engagement direction, wherein said scanning drive means moves said chuck adjacent said attachment fixture, wherein said scanning drive means selectively moves each buffer station within said second plurality thereof into proximity and alignment with said attachment fixture, and wherein said transfer fixture is moved in either direction between a buffer station within said second plurality thereof and a magazine station within said third plurality thereof after said scanning drive moves said buffer station into alignment and proximity with said magazine station;

an engagement actuator moving said attachment fixture in said engagement direction and opposite thereto, wherein said engagement actuator moves said attachment fixture into proximity with a buffer station in said second plurality thereof and in alignment with said attachment fixture, and wherein said probe assembly is selectively moved in either direction between said attachment fixture and said buffer station when said buffer station is moved into alignment with said attachment fixture and when said attachment fixture is moved into proximity with said buffer station.

6. The scanning probe microscope of claim 5, wherein
a portion of said probe assembly is composed of a ferromagnetic material,
said first means for releasably holding said probe assembly includes a first permanent magnet, and an electromagnet which is actuated to counteract an attractive force between said first permanent magnet and said probe assembly,
said second means for releasably holding said probe assembly includes a second permanent magnet in said attachment fixture,
said first permanent magnet holds said probe assembly against a first holding surface of said transfer pallet when said electromagnet is not actuated and when said attachment fixture and said buffer station are held in proximity to one another with said probe assembly therebetween, and
said second permanent magnet holds said probe assembly against a second holding surface of said attachment fixture when said electromagnet is actuated and when said attachment fixture and said buffer station are held in proximity to one another with said probe assembly therebetween.

7. The scanning probe microscope of claim 6, wherein said transfer pallet includes a first pair of magnet actuation contacts connected to said buffer station when said transfer pallet is in engagement with said buffer station and a second pair of magnet actuation contacts connected to said magazine station when said transfer pallet is in engagement with said magazine station, with said first and second pairs of magnet actuation contacts being connected to said electromagnet for actuation thereof.

8. The scanning probe microscope of claim 5, wherein
a portion of said probe assembly is composed of a ferromagnetic material,
said first means for releasably holding said probe assembly includes a first permanent magnet, a pair of armatures extending from opposite poles of said first permanent magnet to a first holding surface of said transfer pallet, and a bucking coil extending around each said armature between said first permanent magnet and said first holding surface of said transfer pallet;
each of said bucking coils is arranged so that, when electric current is driven therethrough, an electromagnetic force is generated which opposes a magnetic force of said first permanent magnet;
said first permanent magnet holds said probe assembly against a first holding surface of said transfer pallet when said electric current does not flow through said bucking coils and when said attachment fixture and said buffer station are held in proximity to one another with said probe assembly therebetween, and
said second permanent magnet holds said probe assembly against a second holding surface of said attachment fixture when electric current flows through said bucking coils and when said attachment fixture and said buffer station are held in proximity to one another with said probe assembly therebetween.

9. The scanning probe microscope of claim 5, wherein
each said transfer pallet is held against a pallet contact surface within said buffer station by a biasing force acting opposite said direction of engagement,
each said buffer station includes first sensing means detecting when said transfer pallet is moved away from said pallet contact surface, and
said engagement actuator operates in response to said first sensing means, stopping motion of said attachment fixture in said engagement direction when said transfer pallet is moved away from said pallet contact surface.

10. The scanning probe microscope of claim 5, wherein
said first means for releasably holding a transfer pallet includes a detent mechanism holding said transfer pallet in a preferred location within said buffer station,
a portion of said transfer pallet is composed of a ferromagnetic material, and
said second means for releasably holding a transfer pallet includes selectively actuated magnetic means providing an attractive force overcoming said detent mechanism to remove said transfer pallet from said buffer station.

11. The scanning probe mechanism of claim 5, wherein
said first means for releasably holding a transfer pallet includes a detent mechanism holding said transfer pallet in a preferred location within said buffer station,
a portion of said transfer pallet is composed of a ferromagnetic material,
said second means for releasably holding a transfer pallet includes pallet engaging surfaces driven to extend from said magazine station for engaging said pallet within said buffer station and returned into said magazine station, a permanent magnet selectively movable with said pallet engaging surfaces for attracting said transfer pallet, and a latch allowing motion of said permanent magnet with said pallet engaging surfaces when said transfer pallet is not initially present within said magazine station and preventing motion of said permanent magnet when said transfer pallet is initially present within said magazine station.

12. The scanning probe microscope of claim 5, wherein
said probe assembly includes an electronic device identifying said probe assembly and a first pair of contact terminals connected to said electronic device,
said transfer pallet includes a second pair of contact terminals engaging said first pair of contact terminals when said probe assembly is held on said transfer pallet, and third and fourth pairs of contacts to which said second pair of contact terminals are electrically connected,
said third pair of contacts is electrically connected to said buffer station when said transfer pallet is engaged with said buffer station, and
said fourth pair of contacts is electrically connected to said magazine station when said transfer pallet is engaged with said magazine station.

13. A method for removing a probe assembly attached to an attachment fixture in a scanning probe microscope, comprising steps of:
a) moving a sample stage having a chuck for mounting a sample to be examined and a buffer including a plurality of buffer stations so that a buffer station within said plurality thereof is in alignment with said attachment fixture;
b) driving said attachment fixture in an engagement direction toward said buffer station in alignment with said attachment fixture; and
c) transferring said probe assembly from said attachment fixture to a transfer pallet within said buffer station.

14. The method of claim 13, wherein
each said transfer pallet is held against a pallet contact surface within said buffer station by a biasing force acting opposite said direction of engagement, each said buffer station includes first sensing means detecting when said transfer pallet is moved away from said pallet contact surface, and step b) is ended when said first sensing means detects that said transfer pallet is moved away from said pallet contact surface.

15. The method of claim 13, wherein a portion of said probe assembly is composed of a ferromagnetic material, said attachment fixture includes a permanent magnet holding said probe assembly thereto, and said transfer pallet includes a permanent magnet holding said probe assembly thereto, overcoming an attractive force from said permanent magnet in said attachment fixture in step c).

16. The method of claim 13, additionally comprising, after step c), steps of:

d) moving said sample stage so that said buffer station is adjacent a magazine station within a stationary magazine; and e) transferring said transfer pallet, with said probe assembly attached thereto, from said buffer station to said magazine station aligned therewith.

17. The method of claim 16, wherein step e) includes steps of:

f) moving a carriage forming a portion of said magazine station, together with a magnet attracting said transfer pallet, in a first direction to engage said transfer pallet in said buffer station; and g) moving said carriage, together with said magnet attracting said transfer pallet, opposite said first direction, carrying said transfer pallet.

18. The method of claim 16, wherein step e) includes steps of:

f) moving a carriage forming a portion of said magazine station in a first direction carrying said transfer pallet to said buffer station, and g) moving said carriage opposite said first direction, leaving said transfer pallet in said buffer station.

19. A method for placing a probe assembly on an attachment fixture in a scanning probe microscope, comprising steps of:

a) moving a sample stage having a chuck for mounting a sample to be examined and a buffer including a plurality of buffer stations so that a buffer station within said plurality thereof is in alignment with said attachment fixture;

b) driving said attachment fixture in an engagement direction toward said buffer station in alignment with said attachment fixture; and c) transferring said probe assembly from a transfer pallet within said buffer station to said attachment fixture.

20. The method of claim 19, wherein each said transfer pallet is held against a pallet contact surface within said buffer station by a biasing force acting opposite said direction of engagement, each said buffer station includes first sensing means detecting when said transfer pallet is moved away from said pallet contact surface, and step b) is ended when said first sensing means detects that said transfer pallet is moved away from said pallet contact surface.

21. The method of claim 19, wherein a portion of said probe assembly is composed of a ferromagnetic material, said attachment fixture includes a permanent magnet holding said probe assembly thereto, said transfer pallet includes a permanent magnet holding said probe assembly thereto, overcoming an attractive force from said permanent magnet in said attachment fixture, and an electromagnet overcoming an attractive force from said permanent magnet in said transfer pallet when said electromagnet is energized, and step c) includes energizing said electromagnet.

22. The method of claim 19, additionally comprising, before step a), steps of:

d) moving said sample stage so that said buffer station is adjacent a magazine station within a stationary magazine; and e) transferring said transfer pallet, with said probe assembly attached thereto, from said magazine station to said buffer station aligned therewith.

23. A scanning probe microscope comprising:

a probe assembly, composed partly of a ferromagnetic material, including a probe;

an attachment fixture including a first permanent magnet holding said probe assembly against a first surface of said attachment fixture during measurements made with said probe assembly;

a buffer station including a second permanent magnet holding said probe assembly against a second surface of said buffer station, and an electromagnet opposing said second permanent magnet when said electromagnet is actuated, wherein said second permanent magnet overcomes said first permanent magnet when said attachment fixture and said buffer station are brought into proximity with said probe assembly therebetween and with said electromagnet not actuated, and wherein said first permanent magnet overcomes said second permanent magnet when said attachment fixture and said buffer station are brought into proximity with said probe assembly therebetween and with said electromagnet actuated.

24. The scanning probe microscope of claim 23, wherein said second permanent magnet has ends of opposite polarities, said buffer station includes an armature extending between each of said ends of said second permanent magnet and said second surface; and said electromagnet includes a first coil extending around a first of said armatures between said second permanent magnet and said second surface.

25. The scanning probe microscope of claim 24, wherein said electromagnet additionally includes a second coil extending around a second of said armatures between said second permanent magnet and said second surface.

* * * * *